US012565060B2

(12) United States Patent
Schacht

(10) Patent No.: US 12,565,060 B2
(45) Date of Patent: Mar. 3, 2026

(54) METHOD OF MANUFACTURING A PANEL

(71) Applicant: Unilin, BV, Wielsbeke (BE)

(72) Inventor: Benny Schacht, Vlamertinge (BE)

(73) Assignee: Unilin, BV, Wielsbeke (BE)

( * ) Notice: Subject to any disclaimer, the term of this patent is extended or adjusted under 35 U.S.C. 154(b) by 0 days.

(21) Appl. No.: 18/728,867

(22) PCT Filed: Jan. 18, 2023

(86) PCT No.: PCT/IB2023/050429
§ 371 (c)(1),
(2) Date: Jul. 13, 2024

(87) PCT Pub. No.: WO2023/139499
PCT Pub. Date: Jul. 27, 2023

(65) Prior Publication Data

US 2025/0083470 A1 Mar. 13, 2025

(30) Foreign Application Priority Data

Jan. 24, 2022 (EP) .................................... 22153021

(51) Int. Cl.
*B44C 3/02* (2006.01)
*B05D 5/00* (2006.01)
*B44C 5/04* (2006.01)

(52) U.S. Cl.
CPC ................ *B44C 3/025* (2013.01); *B05D 5/00* (2013.01); *B44C 5/04* (2013.01)

(58) Field of Classification Search
CPC .............. B44C 3/025; B44C 5/04; B05D 5/00
See application file for complete search history.

(56) References Cited

U.S. PATENT DOCUMENTS

2020/0016627 A1* 1/2020 Pankoke .............. B41J 11/0015
2020/0346246 A1* 11/2020 Pankoke ................. B44C 3/005

FOREIGN PATENT DOCUMENTS

EP 3666525 B1 6/2020
EP 3733308 B1 11/2020
EP 3932684 A1 1/2022
EP 3932684 B1 * 2/2024 .............. B41M 3/00
WO 2021214659 A1 10/2021

OTHER PUBLICATIONS

Surface & Interfacial Tension, NanoScience Instruments (Dec. 1, 2023), https://www.nanoscience.com/techniques/tensiometry/surface-and-interfacial-tension/. (Year: 2023).*

* cited by examiner

*Primary Examiner* — William P Fletcher, III
(74) *Attorney, Agent, or Firm* — Capitol City TechLaw

(57) ABSTRACT

A method of manufacturing a panel including a textured surface may involve the following successive events. A substrate may be provided. A curable substance may be provided onto the substrate. Discrete quantities of a texturing substance may be applied onto the curable substance. At least a part of the curable substance may be cured. A phase transformation of at least one of the texturing substance and a reaction product of the texturing substance and the curable substance may be performed to obtain a non-solid material. The non-solid material may be removed from the cured part of the curable substance.

19 Claims, 1 Drawing Sheet

METHOD OF MANUFACTURING A PANEL

This application claims priority under 35 USC § 119(a)-(d) from EP patent application Ser. No. 22153021.5, which was filed on Jan. 24, 2022, the entire content of which is incorporated herein by reference.

BACKGROUND

1. Field

The present invention relates to a method of manufacturing a panel including a textured surface, for example floor, wall, ceiling and furniture panel.

2. Related Art

Known methods for creating such textured surface comprise the successive steps of supplying a substrate, applying a curable substance onto the substrate, applying discrete quantities of a texturing substance into or onto the curable substance, curing the curable substance and removing softer portion from the cured substance, said softer portion being caused by the texturing fluid, hence forming the panel including the textured surface.

The texturing substance in the known method may prevent portions of the curable substance from curing or modify the curing condition of the curable substance such that after the step of curing these portions are softer than the fully cured portion. The softer solid material can be removed by a mechanical device. A disadvantage of the known method is that the texturing substance and/or a reaction product of the texturing substance and the curable substance may be solid or partly solid when the step of removing non-solid material starts, whereas it is still desired to remove that solid material, as well, from the cured part of the curable substance. This requires relatively high mechanical power and increases the risk of damaging the cured curable substance. Moreover, the mechanical means, for example brushes, are subjected to wear and require continuous substitution and/or registration to constantly maintain the manufacturing quality.

SUMMARY

An object of the invention is to provide a method of manufacturing a panel which minimizes the above-mentioned disadvantages.

This object is accomplished by the invention, wherein between the step of applying discrete quantities of a texturing substance onto the curable substance and the step of removing material from the at least partially cured substance a step of performing at least one phase transformation of the texturing substance and/or of any reaction product of the texturing substance and the curable substance is carried out. Preferably said phase transformation involves transforming the texturing substance and/or any reaction product of the texturing substance and the curable substance into a non-solid material, preferably a fluid phase. For example, said phase transformation can comprise melting, evaporation or sublimation.

An advantage of the present invention is that transformation of the at least one of the texturing substance and the reaction product into the fluid phase makes removal thereof after the step of curing easier.

The resulting panel may be suitable for a floor, wall or ceiling covering or alternative coverings. It may also be a panel that is suitable for furniture, or the like.

The at least one of the texturing substance and the reaction product may be transformed into a gaseous phase, being at least part of the non-solid material. In this case the at least one of the texturing substance and the reaction product may be evaporated to the gaseous phase. A material in the gaseous phase may be removed from the cured curable substance by suction, for example, but it is also possible that it rises from the cured curable substance automatically. It is clear that material in the gaseous phase can be removed easily without contacting the cured curable substance by a mechanical device.

The at least one of the texturing substance and the reaction product may be transformed from the solid phase into a liquid phase, being at least part of the non-solid material. It is easier to remove a material in the liquid phase than in the solid phase, whereas the risk of damaging the cured curable substance is lower.

The non-solid material may be removed by means of suction, rinsing, blowing away or the like.

When the words 'liquid' or 'non-solid' are used herein, a wide range of viscosities may be covered. For example, a pasty material is also regarded as being a liquid or a non-solid material.

In the most preferred embodiment, the texturing substance may be applied through digital printing, especially inkjet printing.

In an embodiment the texturing substance can comprise a solid material, which remains solid during the step of curing at least a part of the curable substance. It may be a powder or a polymer, for example toner in case of applying the texturing substance by means of a digital printer.

Alternatively, the texturing substance may comprise a liquid material, which solidifies after being applied onto or into the curable substance. It may solidify, for example, due to evaporation of a solvent in the liquid material or due to coagulation caused by a temperature decrease after the liquid material has arrived on the curable substance. The texturing substance may be applied through inkjet printing, for example.

The liquid material may solidify before and/or during the step of curing at least a part of the curable substance.

In a particular embodiment the liquid material has a different surface tension than the curable substance. Due to the different surface tensions between the liquid material and the curable substance they repel each other, creating a finely textured surface at regions where the liquid material is applied, i.e. a microstructure. The liquid material may have a higher surface tension than the curable substance.

The surface tensions of the liquid material and the curable substance may be varied by selecting the chemical nature of their base raw materials and by adding specific additives. For example, resins containing polar groups as hydroxyl, amines and aromatic groups will have a surface tension higher than resins containing linear structures of hydrocarbon type. Additives reducing the surface tension may be: silicones, polyether silicones, acrylate silicones, polyether silicones acrylates, fluorinated surfactants, alkoxylated alcohols. Additives increasing the surface tension may be: amines, polyethers macromers-modified polyacrylates, silicon and polyethers macromers-modified polyacrylates.

The curable substance may be a liquid that contains a photo crosslinking resin, for example (meth) acrylate and/or vinyl monomers and/or acrylate oligomers.

The liquid material may be a varnish. The varnish may contain water and/or solvents to control its viscosity. The liquid material may have various chemical nature, for example a polyurethane, epoxy, photo-crosslinking, acrylate, acrylic resin or the like.

Photo-crosslinking resins have in common the fact of polymerizing and hardening thanks to the energy irradiated by ultraviolet ray devices and/or by irradiation with EB (Electron Beam) and are divided in different types based on the cross-linking mechanism: 1) radical resins, typically from vinyl monomers and acrylate resins that are divided in different subcategories: epoxy-acrylate, urethane-acrylate, polyester-acrylate, polyether-acrylate, amino-acrylate, silicon-acrylate, polyisoprene-acrylate, polybutadiene acrylate and acrylate monomers. Among the vinyl monomers can be cited N-vinyl caprolactame (NVC), acryloyl morpholine (ACMO), diethylene glycol divinyl ether (DVE-2), triethylene glycol divinyl ether (DVE-3) and mixtures thereof. 2) cationic resin such as epoxy resin, polyols and monomers such as oxetanes and vinyl ethers.

The curable substance may be applied by means of inkjet printing, screen printing, roller printing, spraying, curtain coating or the like. In the preferred embodiment the curable substance is provided via roller coating as it allows for higher quantity deposition and therefore for higher thickness of the texture. The liquid material and/or the curable substance may comprise a synthetic resin which is polymerized during the step of curing, more specifically via free radical polymerization.

The step of curing may comprise irradiating, preferably UV irradiating. Alternative irradiating methods are X-ray radiation, laser radiation, electron beam radiation, visible light, infrared, or the like. In case of UV radiation the curable substance may contain photo initiators for initiating free radical polymerization.

In an embodiment the texturing substance may form a mask which obstructs irradiating the curable substance or inhibits the curing of the curable substance where the mask is applied in or on the curable substance. For example, in some embodiment, the texturing substance may comprise a radiation absorber or radiation reflector. In other embodiments, the texturing substance forming the mask may comprise an electron scavenger or an anti-oxidant so as to inhibit propagation of radicals In the preferred embodiment, the texturing substance can penetrate into the curable substance when applied onto the curable substance. Due to penetration into the curable substance the surface of the curable substance at the location of impact may be textured. To this aim it is preferable that the texturing substance has a partial or complete solubility with the curable substance, and/or that the surface tension of the curable substance and of the texturing substance are substantially the same. In this way the texturing substance can penetrate deeper into the curable substance thereby forming deeper structure. Moreover, said penetration can occur without displacement of the curable substance that, during subsequent curing, could lead to forming undesired peak or crest in the surface of the panel.

The texturing substance and the curable substance may react which each other to yield a solid reaction product before and/or during the step of curing the curable substance, wherein the solid reaction product has different material properties than the cured curable substance. For example, the melting point, glass transition temperature, softening temperature, sublimation temperature or boiling temperature of the solid reaction product may be lower than that of the cured curable substance. For example, in some embodiments the texturing fluid can comprise a substance that locally reduces the melting temperature of the cured substance, for example a salt or a melting agent.

The step of transforming the at least one of the texturing substances and the reaction product into the fluid phase may be performed by exposing at least one of the texturing substance and the reaction product to an elevated temperature or radiation, preferably infrared radiation or microwave radiation. During this step at least one of the solid texturing substance and reaction product can be melted. For example, said step of transforming can comprise bringing at least the surface of the panel, in particular at least the cured substance to a transformation temperature that is between the melting temperature of the cured substance and the melting temperature of the texturing substance and/or of any reaction product The substrate may be made of a wood-based material, preferably MDF or HDF, or thermoplastic, preferably vinyl, for example WPC, SPC or LVT, polypropylene, polyurethane, metal, glass, stone, ceramic, textile, non-woven fabric, polymeric composite, mineral-based material like MgO, or cement or the like. The substrate may be rigid or flexible such that the resulting panel is rigid or flexible, respectively.

The step of irradiating may comprise UV irradiating.

Before the step of applying the curable substance a decor may be applied on the substrate. The decor may comprise a pattern, for example imitating a wood, a stone or a cement material.

The decor may be applied directly onto the substrate, for example by means of inkjet printing. The expression 'applied directly' does not exclude that intermediate layers, like primers or ink receiver layers, are applied onto the substrate prior to applying the decor. The decor may be printed using water-based inks, solvent based inks, oil based inks or, preferably, UV curable inks. The decor and the texturing substance may be printed in register. This results in a surface texture which is in register with the decor. It is possible to obtain an extremely precise synchronization of the decor and the surface texture by digital printing. Moreover, this high precision synchronization can be obtained for an increased variety of the decors, without the need of maintaining a huge stock of preformed structured sheets to be attached to the substrate.

A primer, or any alternative basecoat, may be applied onto the substrate before applying the decor.

The primer may at least partly be cured before applying the decor.

Alternatively, the decor may be applied by means of a decorative layer which is attached to the substrate, for example a printed paper or plastic foil. It may be attached by gluing, thermal lamination or lamination, for example.

The curable substance may be transparent at least after curing. The transparency of the curable substance is preferably in correspondence to the visible radiation so that a decor being present between the substrate and the curable substance is visible.

The step of transforming at least one of the texturing substance and the reaction product from a solid phase into a fluid phase may be performed after the curable substance is entirely solidified such that at least one of the texturing substance and the reaction product does not contaminate the curable substance. It is, however, also possible that the step of transforming at least one of the texturing substance and the reaction product from a solid phase into a fluid phase is performed before the curable substance is entirely solidified such that at least one of the texturing substance and the reaction product can contaminate the curable substance. In the latter case a variation of gloss degree can be obtained.

BRIEF DESCRIPTION OF THE DRAWINGS

The invention will hereafter be elucidated with reference to very schematic drawings showing embodiments of the invention by way of example.

DESCRIPTION OF NON-LIMITING EMBODIMENTS

Figure 1:
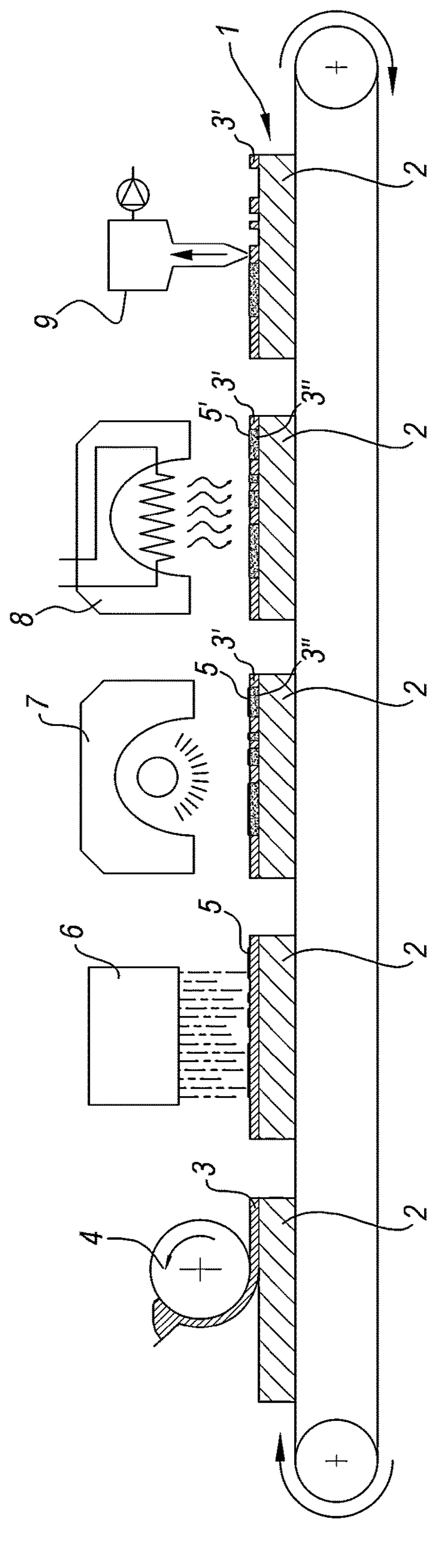
FIG. 1 is an illustrative view, showing successive steps of an embodiment of a method of manufacturing a panel including a textured surface according to the invention.

FIG. 1 illustrates successive steps of an embodiment of a method of manufacturing a panel 1 including a textured surface according to the invention. The leftmost picture of FIG. 1 shows a substrate 2 onto which a curable substance 3 is applied by means of a roller 4. The substrate 2 may be made of a wood-based material, a plastic-based material or mineral-based material. The curable substance 3 may have anti-wear properties.

On top of the curable substance 3 discrete quantities of a texturing substance in the form of solid particles, for example a powder, which form a mask 5 are printed by means of a digital mask printer 6. The texturing substance is configured such that the mask 5 prevents the curable substance 3 from being cured by means of UV radiation where it is covered by the mask 5. The mask 5 is printed according to a pattern, for example a wood pattern. It may be printed in register with a decorative pattern on the substrate 2, which in turn may be applied directly onto the substrate 2, for example by means of digital printing, or indirectly by attaching a decorated sheet to the substrate 2 before applying the curable substance 3.

In a next step the curable substance 3 including the mask 5 is irradiated by means of a UV radiator 7 so as to cure the curable substance 3 at areas which are free from the mask 5. Since the mask 5 obstructs radiation from the UV radiator 7 the curable substance below the mask 5 does not solidify. In FIG. 1 cured portions of the curable substance 3 are indicated by reference sign 3' and non-cured portions are indicated by reference sign 3". The UV radiator 7 may be provided with Hg lamps and/or LED lamps for creating photo-polymerization in the curable substance 3.

After the step of curing, the substrate 2 including the partly cured layer 3', 3" and the solid mask 5 are exposed to a heater 8, which melts the mask 5 such that that the mask 5 is transformed into the liquid phase. The solid mask 5 may have a lower melting point than the cured curable substance 3' such that only the mask 5 is liquified. The liquified mask is indicated by reference number 5' in FIG. 1. Subsequently, the liquified mask 5' and the non-cured curable substance 3" are removed by means of a vacuum device 9 or rinsed away. This results in the panel 1, which has a textured upper surface, see the rightmost picture of FIG. 1. It is possible that the mask 5 prevents the curable substance 3 from being cured by means of UV radiation just below the mask 5. In that case the roughness of the textured surface will be less than that illustrated in the rightmost picture of FIG. 1.

In an alternative embodiment (not shown) the mask 5 may be formed by a liquid material that is printed onto or, preferably, into the curable substance 3 to locally prevent curing of the curable substance. The heater 8 is then adapted to heat the surface of the panel in which the liquid texturing fluid and the still liquid curable substance evaporate and are subsequently sucked away by the vacuum device. In this case the cured curable substance is a thermosetting resin that cannot melt so that it is not affected by heating.

Figure 2:
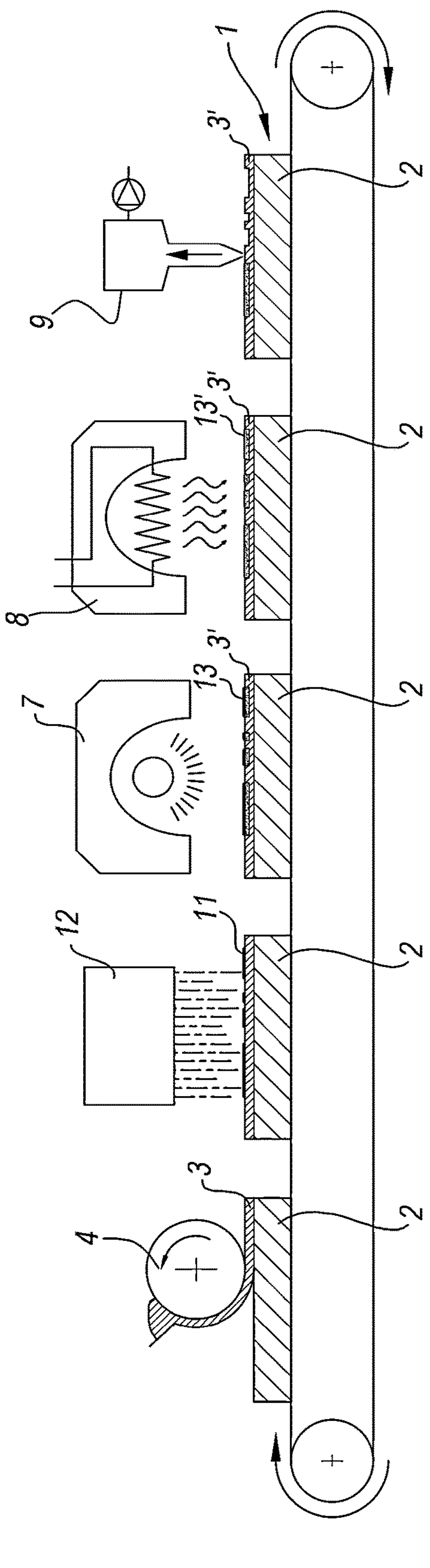
FIG. 2 is a similar view as FIG. 1, illustrating an alternative embodiment.

FIG. 2 illustrates an alternative embodiment, in which on top of the curable substance 3 discrete quantities of a texturing substance in the form of a solid or liquid reagent 11 is printed by means of a digital reagent printer 12. The reagent 11 may be printed in a decorative pattern and may be in register with a decorative pattern on the substrate 2. The reagent 11 and the curable substance 3 are configured such that they react with each other to a solid reaction product 13 which has different properties than the curable substance 3 in a cured state.

In a next step the curable substance 3 including the solid material 13 is irradiated by means of the UV radiator 7 so as to cure the curable substance 3 around the solid material 13 to the cured state 3'. It is also possible that the reagent 11 and curable substance 3 react or still react with each other when the substrate 2, the reagent 11 and the curable substance 3 are exposed to the UV radiator 7.

After the step of curing, the heater 8 melts the solid material 13 such that it is transformed into the liquid phase which is indicated by reference number 13' in FIG. 2. Then, the liquid 13' is removed by the vacuum device 9. This results in the panel 1, which has a textured upper surface as illustrated in the rightmost picture of FIG. 2.

The invention is not limited to the embodiments shown in the drawings and described hereinbefore, which may be varied in different manners within the scope of the claims and their technical equivalents.

The invention is further disclosed by the following list of numbered items.

1. A method of manufacturing a panel (1) including a textured surface, comprising the successive steps of: supplying a substrate (2), applying a curable substance (3) onto the substrate (2), applying discrete quantities of a texturing substance (5, 11) onto the curable substance (3), curing at least a part of the curable substance (3), performing a phase transformation of at least one of the texturing substance (5) and a reaction product (13) of the texturing substance (11) and the curable substance (3), preferably into a fluid phase, to obtain a non-solid material removing non-solid material (3", 5', 13') from the at least cured part of the curable substance, hence forming the panel (1) including the textured surface.
2. A method according to item 1, wherein the at least one of the texturing substance and the reaction product is transformed into a gaseous phase, being at least part of the non-solid material.
3. A method according to item 1 or 2, wherein the at least one of the texturing substance (5) and the reaction product (13) is transformed from a solid phase into a liquid phase, being at least part of the non-solid material.
4. A method according to item any of the preceding items, wherein the non-solid material (3", 5', 13') is removed by means of suction, rinsing, blowing away or the like.
5. A method according to any one of the preceding items, wherein the texturing substance (5, 11) is applied through digital printing.
6. A method according to any one of the preceding items, wherein the texturing substance (5, 11) comprises a solid material, which remains solid during the step of curing at least a part of the curable substance (3).

7. A method according to any one of the items 1-5, wherein the texturing substance (5, 11) comprises a liquid material, which solidifies after being applied onto the curable substance (3).
8. A method according to item 7, wherein the liquid material solidifies before the step of curing at least a part of the curable substance (3).
9. A method according to any of the preceding items, wherein the liquid material has a different surface tension than the curable substance (3).
10. A method according to any one of the preceding items, wherein the step of curing comprises irradiating, preferably UV irradiating (7).
11. A method according to any of the preceding items, wherein the texturing substance forms a mask (5) which obstructs or inhibit curing of the curable substance (3) where the mask is applied on or in the curable substance (3).
12. A method according to any one of the preceding items, wherein the texturing substance penetrates into the curable substance when applied onto the curable substance (3).
13. A method according to any one of the preceding items, wherein the texturing substance (11) and the curable substance (3) react which each other to yield a solid reaction product (13) before and/or during the step of curing the at least part of the curable substance (3), wherein the solid reaction product (13) has different material properties than the cured curable substance (3').
14. A method according to any one of the preceding items, wherein the step of transforming the at least one of the texturing substance (5) and the reaction product (13) into the fluid phase is performed by exposing the at least one of the texturing substance (5) and the reaction product (13) to an elevated temperature or radiation (8), preferably infrared radiation or microwave.
15. A method according to any one of the preceding items, wherein the substrate (2) is made of a wood-based material, preferably MDF or HDF, or a plastic-based material, preferably PVC or PP, or mineral-based, preferably MgO, or cement.
16. A method according to any one of the preceding items, wherein a decor is applied on the substrate (2) before the step of applying the curable substance (3).
17. A method according to item 16, wherein the decor is applied directly onto the substrate (2).
18. A method according to item 16 or 17, wherein a primer, or any alternative basecoat, is applied onto the substrate (2) before applying the decor.
19. A method according to item 16, wherein the decor is applied by means of a decorative layer which is attached to the substrate (2), for example a printed paper or plastic foil.
20. A method according to any one of the preceding items, wherein the curable substance (3) is transparent at least after curing.

The invention claimed is:

1. A method of manufacturing a panel including a textured surface, the method comprising, in successive order:

supplying a substrate;

applying a curable substance onto the substrate;

applying discrete quantities of a texturing substance onto the curable substance;

curing at least a part of the curable substance;

performing a phase transformation of at least one of the texturing substance and a reaction product of the texturing substance and the curable substance to obtain a non-solid material; and removing the non-solid material from the cured part of the curable substance;

wherein the texturing substance and the curable substance react with each other to yield a solid reaction product before and/or during curing the part of the curable substance;

wherein the solid reaction product has different material properties than the cured curable substance.

2. The method according to claim 1, wherein the at least one of the texturing substance and the reaction product is transformed into a gaseous phase that is part of the non-solid material.

3. The method according to claim 1, wherein the at least one of the texturing substance and the reaction product is transformed from a solid phase into a liquid phase that is part of the non-solid material.

4. The method according to claim 3, wherein the at least one of the texturing substance and the reaction product is transformed into a fluid phase by exposing the at least one of the texturing substance and the reaction product to an elevated temperature or radiation.

5. The method according to claim 1, wherein the non-solid material is removed by suction, rinsing, or blowing away.

6. The method according to claim 1, wherein the texturing substance is applied through digital printing.

7. The method according to claim 1, wherein the texturing substance comprises a solid material, which remains solid during curing at least a part of the curable substance.

8. The method according to claim 1, wherein the texturing substance comprises a liquid material, which solidifies after being applied onto the curable substance.

9. The method according to claim 8, wherein the liquid material solidifies before curing at least a part of the curable substance.

10. The method according to claim 8, wherein the liquid material has a different surface tension than the curable substance.

11. The method according to claim 1, wherein curing comprises irradiating).

12. The method according to claim 1, wherein the texturing substance forms a mask which obstructs or inhibits curing of the curable substance where the mask is applied on or in the curable substance.

13. The method according to claim 1, wherein the texturing substance penetrates into the curable substance when applied onto the curable substance.

14. The method according to claim 1, wherein the substrate is made of a wood-based material, a plastic-based material, a mineral-based material, or cement.

15. The method according to claim 1, wherein a decor is applied on the substrate before applying the curable substance.

16. The method according to claim 15, wherein the decor is applied directly onto the substrate.

17. The method according to claim 15, wherein a primer, or any alternative basecoat, is applied onto the substrate before applying the decor.

18. The method according to claim 15, wherein the decor is applied as a decorative layer which is attached to the substrate.

19. The method according to claim 1, wherein the curable substance is transparent at least after curing.

* * * * *